US006976829B2

United States Patent
Kovalsky et al.

(10) Patent No.: US 6,976,829 B2
(45) Date of Patent: Dec. 20, 2005

(54) ROTOR BLADE TIP SECTION

(75) Inventors: David A. Kovalsky, Shelton, CT (US); Corey D. Jones, Prospect, CT (US); Kevin P. Viola, Wallingford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 48 days.

(21) Appl. No.: 10/621,164

(22) Filed: Jul. 16, 2003

(65) Prior Publication Data

US 2005/0013694 A1    Jan. 20, 2005

(51) Int. Cl.[7] .............................................. F01D 5/18
(52) U.S. Cl. ..................... 416/226; 416/237
(58) Field of Search ............................. 416/226, 229 R, 416/237, 239; 29/889.7, 889.6, 889.71

(56) References Cited

U.S. PATENT DOCUMENTS

| 3,721,507 A | * | 3/1973 | Monteleone ............ 416/223 R |
| 4,120,610 A | * | 10/1978 | Braswell et al. ............ 416/226 |
| 5,320,494 A | | 6/1994 | Reinfelder et al. |
| 5,885,059 A | | 3/1999 | Kovalsky et al. |
| 5,954,898 A | | 9/1999 | McKague et al. |
| 6,168,383 B1 | | 1/2001 | Shimizu |
| 6,231,308 B1 | | 5/2001 | Kondo et al. |

* cited by examiner

Primary Examiner—Edward K. Look
Assistant Examiner—Dwayne J. White
(74) Attorney, Agent, or Firm—Carlson, Gaskey & Olds (57) ABSTRACT

A main rotor blade includes a tip section having a splice cap, a structural tip spar, a core and an upper and lower tip skin. The tip section is mounted to a central blade section by mounting the tip spar to a main blade spar. The tip spar includes a first surface substantially parallel to a second surface. The first and second surfaces each extend from a shear web therebetween to define the generally C-shape in cross section. The shear web generally carries rotor blade torsional loads and eliminates the heretofore required structural core. A section of the tip spar overlaps a section of the main blade spar. The tip section thereby transfers the loads carried thereby through interaction between the overlapped spar sections. The tip section core and skins need not be structural members as the tip spar carries rotor blade tip section torsional loads.

27 Claims, 7 Drawing Sheets

ROTOR BLADE TIP SECTION

BACKGROUND OF THE INVENTION

The present invention relates to a rotary wing aircraft rotor blade, and more particularly to a rotor blade tip spar arrangement.

Conventional rotary wing aircraft rotor blades often include a tip section of a selected sweep, taper, and form to improve the blade performance. Anhedral tip sections increase hover performance and lift capabilities of a rotary wing aircraft on which the blades are fitted without increasing the structural features of the main rotor hub and spindle.

The tip section of the main rotor blade is subjected to the greatest stresses/strains due to aerodynamic forces, and concomitantly experiences the greatest structural degradation due to wear and abrasion (due to the high rotational velocity of the main rotor blade tip), during operation of the helicopter main rotor assembly. These forces are only increased upon a tip section which utilizes an anhedral or other non-straight form.

Disadvantageously, a tip section that utilizes a non-straight form may be relatively difficult and expensive to manufacture. For example, current anhedral tip sections require numerous structural components to carry the loads induced by the anhedral form. Current anhedral tip sections each require two structural anhedral tip skins and two structural honecomb core pieces along with non-structural pieces and redundant fasteners. Structural components may cost five times that of non-structural components. Furthermore, structural components require multiple expensive manufacturing, and in some instances proprietary, processes to produce the anhedral tip sections.

Accordingly, it is desirable to provide an inexpensive rotor blade tip section that is applicable to anhedral form, minimizes the number of structural components, yet avoids adversely affecting the load bearing capabilities of the rotor blade.

SUMMARY OF THE INVENTION

The main rotor blade according to the present invention provides a non-straight tip section, which includes a splice cap, a tip spar, a core and an upper and lower non-structural tip skin. The core and skins need not be structural members as the tip spar carries rotor blade tip section torsional loads. Relatively complex tip section forms that utilize a minimum of structural components are readily achieved by the present invention.

The tip section is mounted to a central blade section by mounting the tip spar to a main blade spar. The tip spar includes a first surface substantially parallel to a second surface. The first and second surfaces each extend from a shear web therebetween to define a generally C-shape in cross section. The shear web generally carries rotor blade torsional loads and eliminates the heretofore required structural core. A section of the tip spar overlaps a section of the main blade spar. The tip section thereby transfers the loads carried thereby through interaction between the interaction of the overlapped spar sections.

The present invention therefore provides an inexpensive rotor blade tip section that is applicable to anhedral form, minimizes the number of structural components, yet avoids adversely affecting the load bearing capabilities of the rotor blade.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
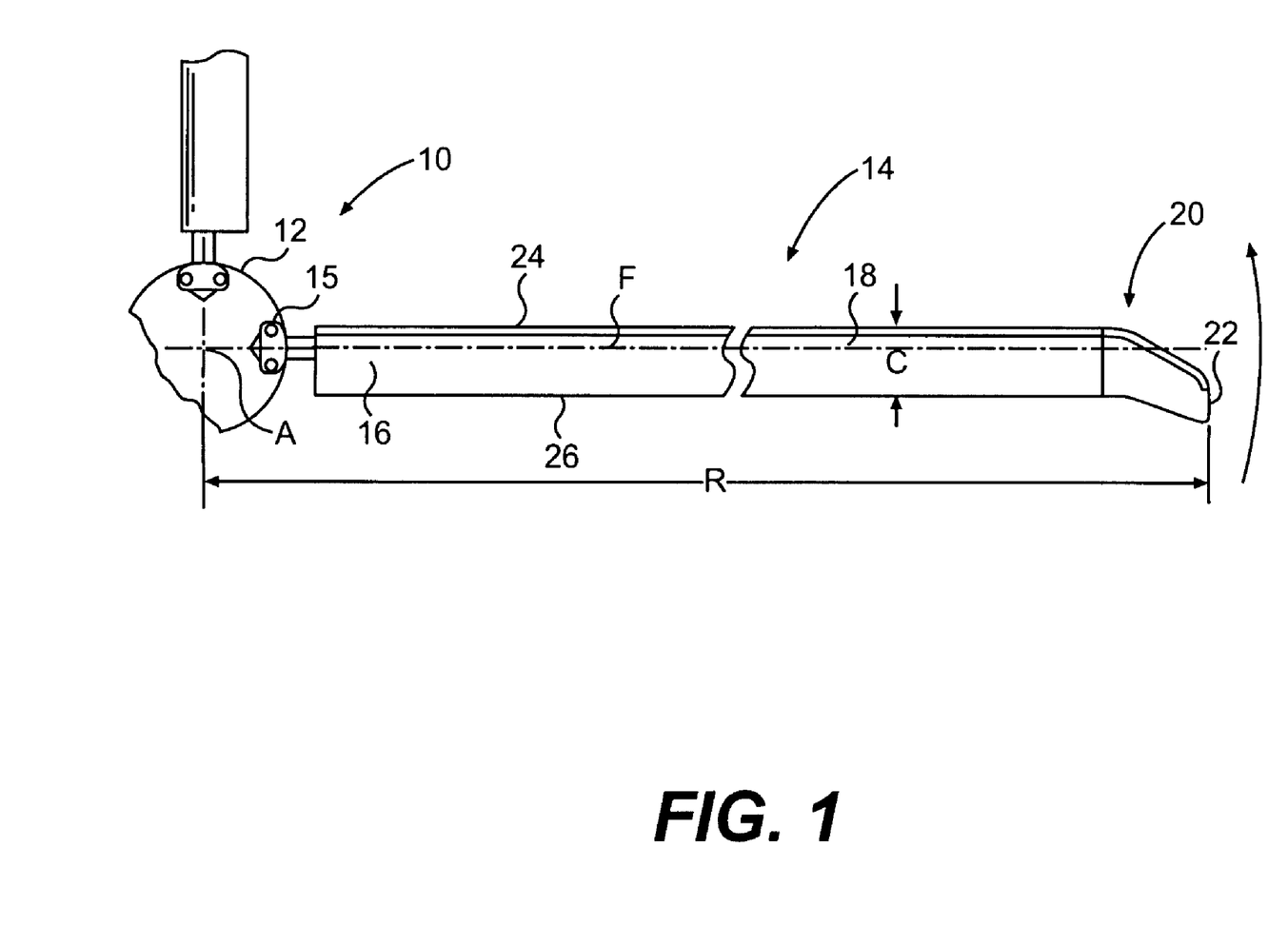
FIG. 1 is a top plan view of an exemplary main rotor blade assembly.

FIG. 1 illustrates a general perspective view of a helicopter rotor system 10 which includes a hub assembly 12 to be driven for rotation about an axis of rotation A. A plurality of main rotor blade assemblies 14 project substantially radially outward from the hub 12 and are supported therefrom in conventional fashion by an attachment 15. A longitudinal axis F is defined along a longitudinal length of each main rotor blade assembly 14. Any number of blade assemblies 14 may be used with the rotor system 10. It should be understood that although a particular rotor system 10 is illustrated in the disclosed embodiment, other attachments, flex beams, main and tail rotors will benefit from the present invention.

Each main rotor blade assembly 14 includes a root section 16, a central section 18 of aerodynamic shape, and a tip section 20, which culminates in a blade tip 22. The blade sections 16, 18, 20 cooperate with the hub 12 to define a blade radius R between the axis of rotation 13 and the blade tip 22. A blade chord C extends between a blade leading edge 24 and a blade trailing edge 26.

The blade assembly 14 is fabricated with a selectively shaped tip section which includes a selected combination of rearward sweep, taper, dihedral, width, and anhedral. The tip section 20 operates to unload the blade tip 22, thereby producing a more uniform lift distribution throughout the spar of the blade and also producing a more uniform downwash effect, as well as decreasing the power required to drive the rotor 10 and thereby increasing lift and hover performance. The tip section preferably reduces the intensity of the tip trailing edge vortex and also directs or displaces the tip trading edge vortex so that it causes minimal interference on the following blade. The rotor blade tip section 20 preferably includes an anhedral form, however, other angled and non angled forms such as cathedral, gull, bent, and others will benefit from the present invention.

Figure 2:
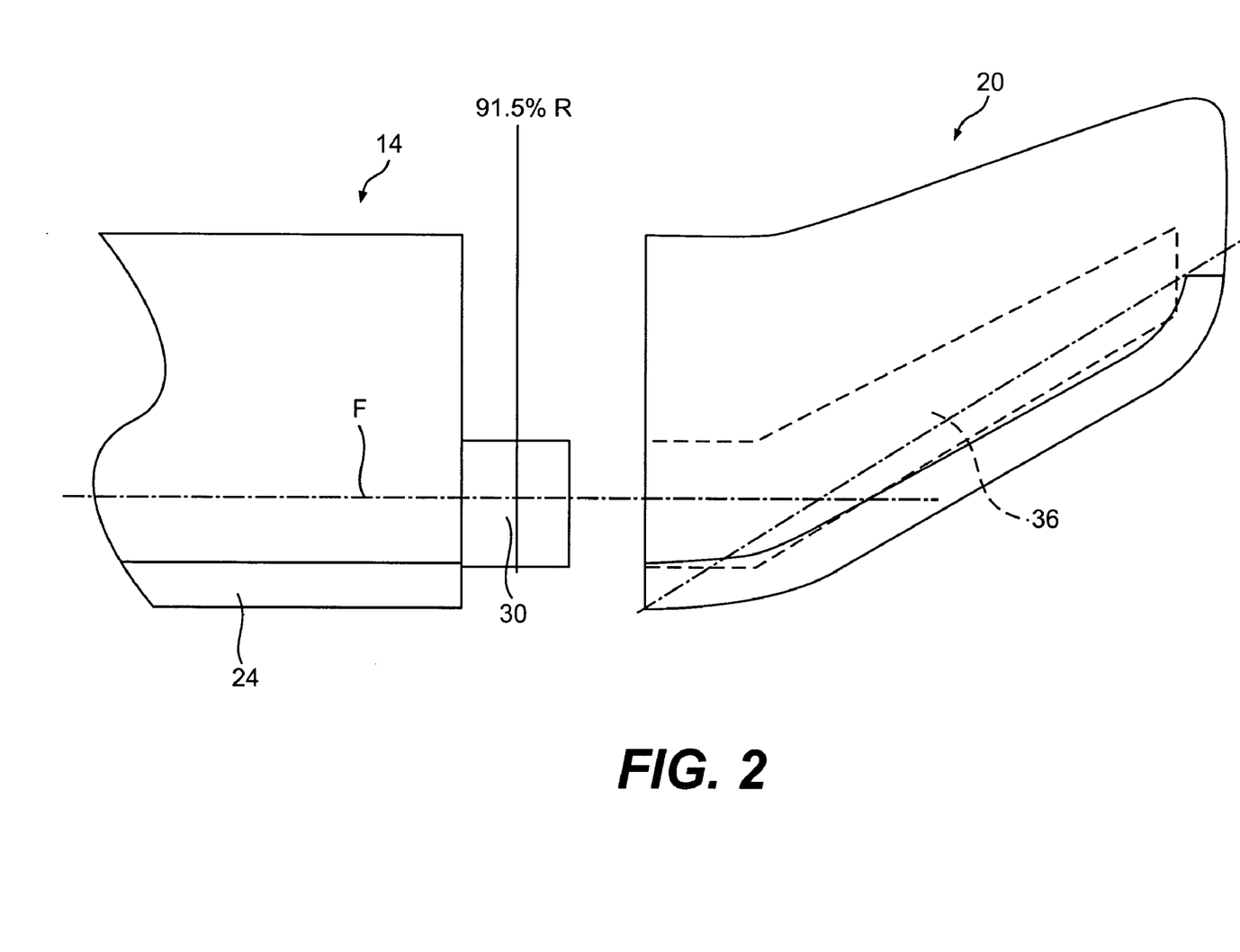
FIG. 2 is an expanded to plan view of a tip section of a rotor blade.
Figure 3:
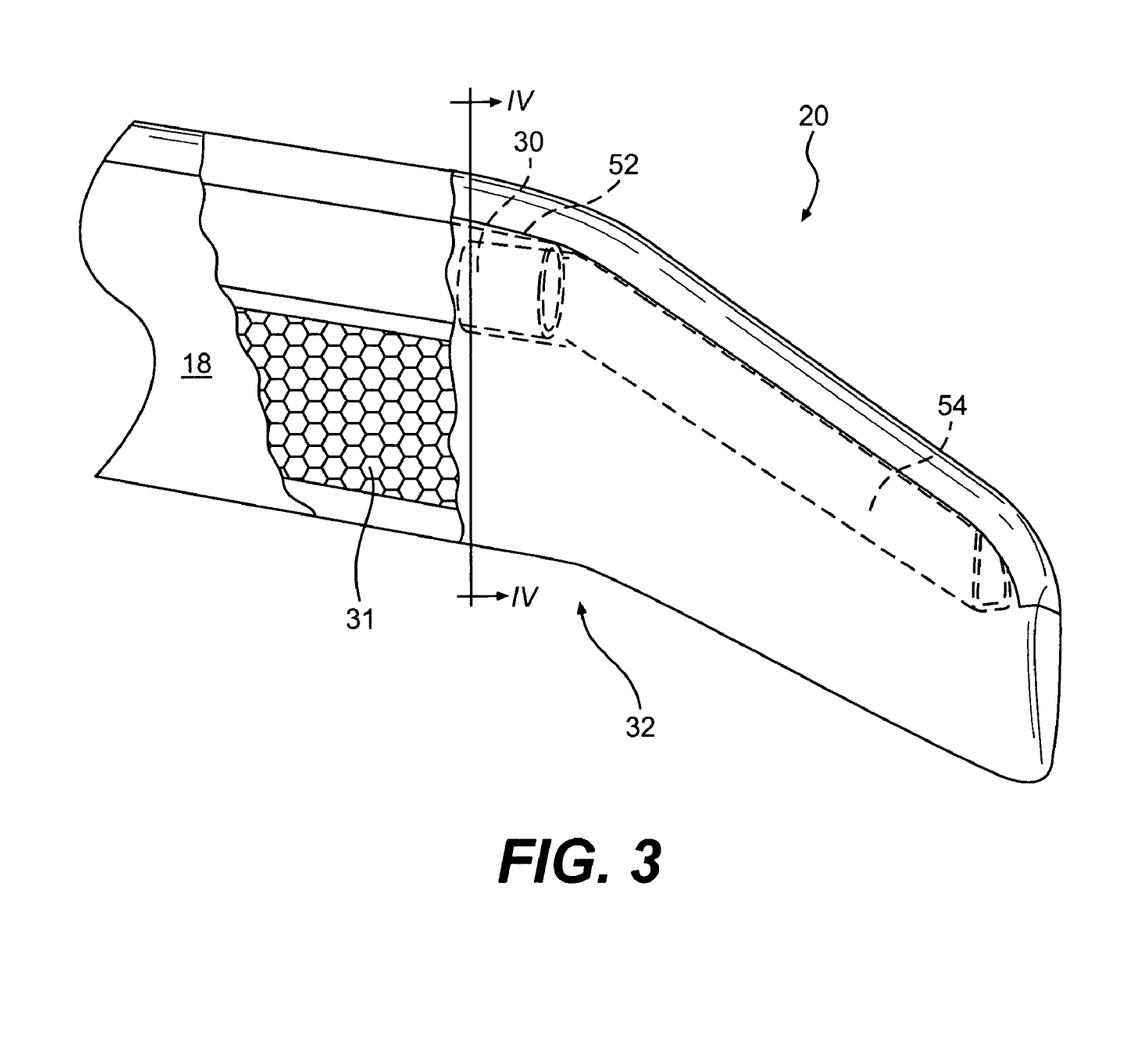
FIG. 3 is an expanded partial phantom perspective view of a tip section of a rotor blade.

Referring to FIG. 2, each blade assembly 14 includes a main blade spar 30 which extends from the root section 16, through the central section 18, and into the tip section 20 preferably prior to an anhedral droop 32 (FIG. 3). The main blade spar 30 is a structural member having high torsional and axial stiffness and strength, and in the preferred embodiment is made of a high strength composite material. However, the spar may also be made from a high strength metal, such as titanium. The blade assembly 14 extending from the root section 16 and through the length of the central section 18 preferably include a core material covered by a composite skin (illustrated schematically at 31; FIG. 3) which defines the aerodynamic shape of the blade as generally known.

Figure 4:
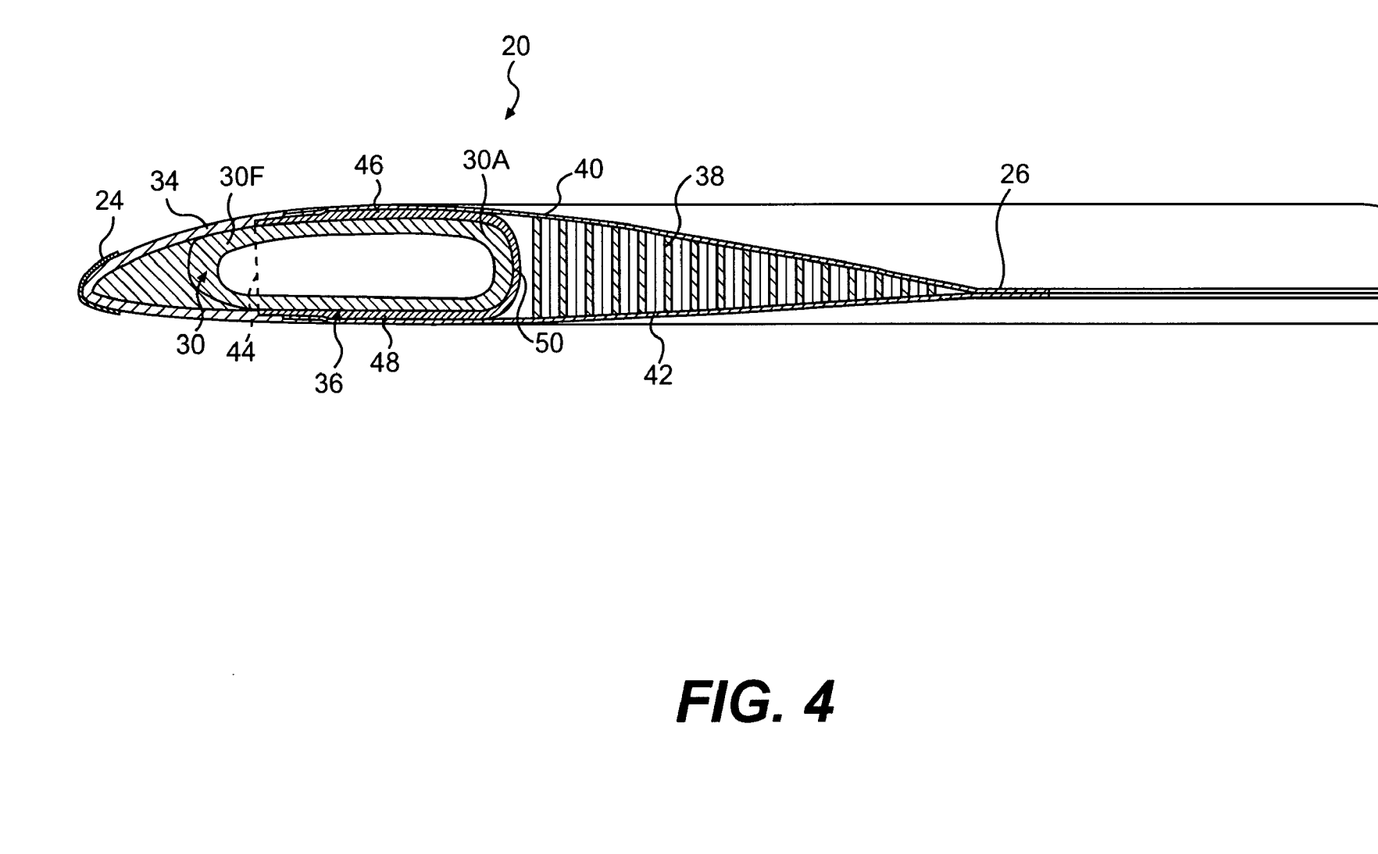
FIG. 4 is a cross-sectional view of the main rotor blade of FIG. 3 taken along line 3—3 thereof.

Referring to FIG. 4, a sectional view of the tip section 20 is illustrated. The tip section 20 includes a splice cap 34, a tip spar 36, a core 38, and an upper and lower non-structural tip skin 40, 42 (also illustrated in an exploded format in FIG. 5). The tip spar 36 is preferably the only structural component within the tip section 20. The splice cap 34 is mounted around a leading edge portion 30F of the main rotor main blade spar 30 and the tip spar 36 is mounted around a trailing edge aft portion 30A of the main rotor main blade spar 30.

The splice cap 34 is made of a wear-resistant material, such as nickel to provide abrasion protection for the tip section 20. The splice cap 34 also provides control of airfoil tolerances of the tip section 22. The splice cap 34 preferably attaches to an open end 44 of the generally C-shaped tip spar 36 and overlays the forward edges of the skins 40, 42. The splice cap 34 and tip spar 36 mount directly to the main rotor main blade spar 30 (FIG. 3) to provide a rigid structure which supports the loads induced by the tip section 20 with a minimum of structural components. The splice cap 34 and tip spar 36 are preferably bonded to the main rotor main blade spar 30 and additionally may include redundant fasteners. An adhesive material, such as epoxy film adhesive, is a preferred bonding agent.

The tip spar 36 preferably includes a first surface 46 substantially parallel to a second surface 48. The first and second surfaces 46, 48 each extend from a shear web 50 therebetween to define the generally C-shape in cross section. The shear web 50 generally carries rotor blade torsional loads and eliminates the heretofore required structural core. The shear web 50 preferably conforms to the trailing edge portion 30A of the main rotor main blade spar 30.

The first and second surfaces 46, 48 and shear web 50 need not be planar and need not be of consistent thickness. That is, a more rounded C-shape in cross section, a U-shape in cross section or other combinations of shapes which generally mate with a main rotor spar will benefit from the present invention.

Figure 6:
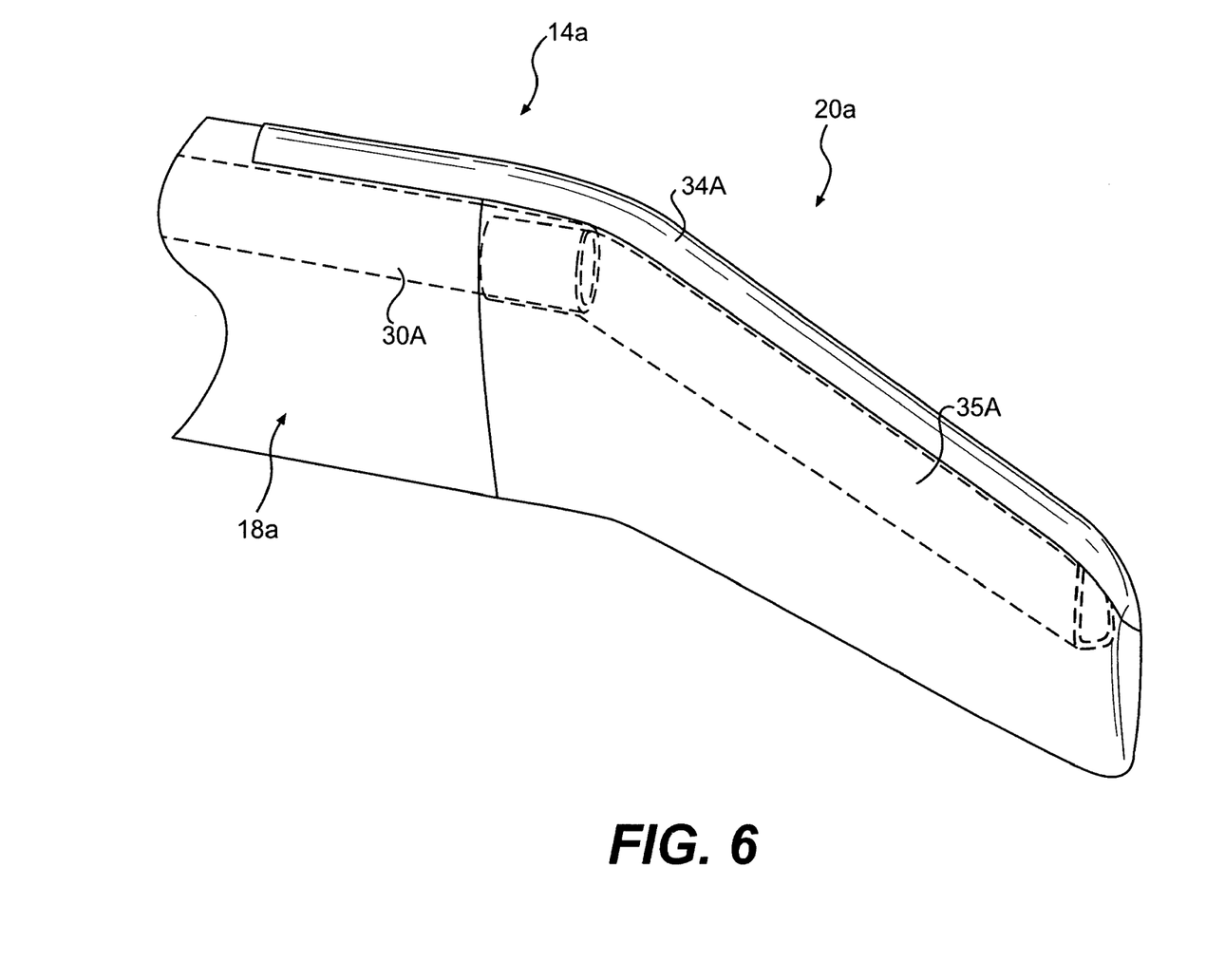
FIG. 6 is an expanded partial phantom perspective view of an extended tip section of a rotor blade.
Figure 7:
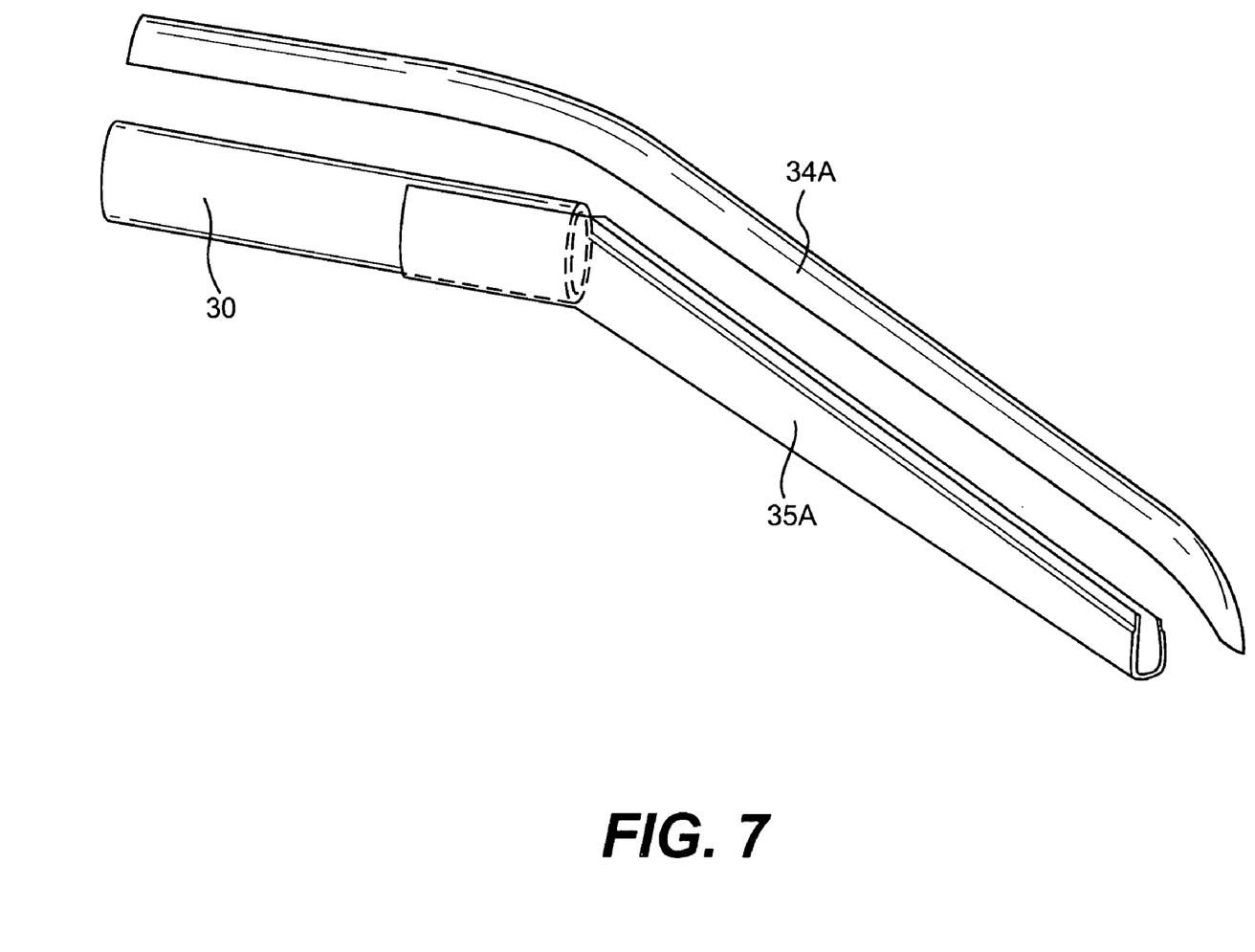
FIG. 7 is an exploded view of a tip section of a rotor blade illustrated in FIG. 6.

The tip spar 36 defines a first spar section 52 angled relative a second spar section 54. That is, the first spar section 52 generally extends along an axis defined by the main rotor main blade spar 30 and the second section is angled relative thereto to define an anhedral form. It should be understood that the tip spar 36 may alternatively include multiple sections angled relative to each other to define other tip sections such as a multi-angled cathedral tip section 20a (FIGS. 6 and 7). Relatively complex forms are readily achieved by the present invention.

Preferably, the tip spar 36 is manufactured from IM7 graphite material in female mold, vacuum bagged and cured as generally known. The tip spar 36 may then be NDI inspected as also generally known. It should be understood various manufacturing processes will also benefit from the present invention.

The tip section 20 is mounted to the central section 18 by mounting the tip spar 36 to the main blade spar 30. The tip spar 36 is mounted to the main rotor blade spar 30 through bonding, however, other removable attachment arrangements will also benefit from the present invention such that the tip section 20 is field replaceable.

Figure 5:
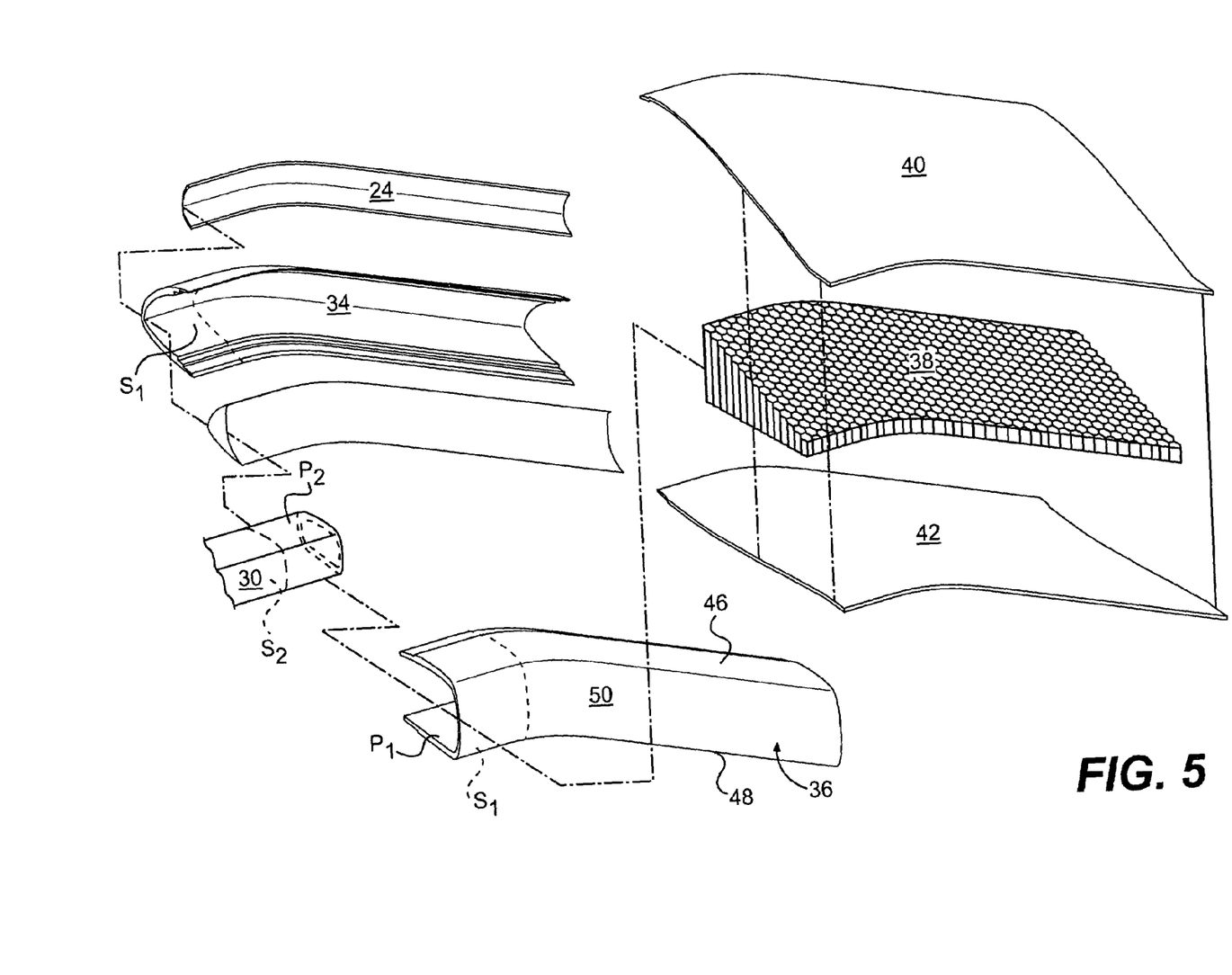
FIG. 5 is an exploded view of a tip section of a rotor blade.

Referring to FIG. 5, a section S1 of the tip spar 36 and the splice cap 34 overlaps a section S2 of the main rotor blade spar 30. That is, sections S1, S2 define a length along the main rotor blade spar 30 and a length of the tip spar 36 and the splice cap 34 which fit in a male female relationship. Preferably, the center of the overlap is located at approximately 91.5% R (FIG. 2). It should be understood that other overlap length and locations will also benefit from the present invention. The inner perimeter P1 of section S1 and the outer perimeter P2 of section S2 are preferably reduced such that the tip spar 36 and the splice cap 34 follow the contour of the shape of the tip spar 36 and the splice cap 34 to form a flush surface joint (FIG. 4). It should be understood that other interfaces will also benefit from the present invention. The tip section 20 thereby transfers the loads carried thereby through interaction between the interaction of the sections S1 and S2.

The core 38 is preferably a one-piece non-structural member as the tip spar 36 carries rotor blade tip section torsional loads. The core is preferably a non-formed, low-density core piece of a three pound density which replaces conventional multiple structural cores thereby reducing part count and machining operations.

The upper and lower non-structural tip skin 40, 42 are preferably non-structural skins such as a three ply fiberglass lay-up. Alternatively, the skins are formed using layers of graphite fiber and fiberglass fiber such that the skins include three layers of fiberglass fiber, and in the leading edge of the blade, where the blade is subject to the greatest wear and tear, layers of graphite fiber are added to further enhance the strength and durability of the skin.

Referring to FIG. 6, another blade assembly 14A is illustrated. The tip spar 35A is of an extended length and includes an extended splice cap 34A (FIG. 7), which forms the leading edge of both the tip section 20A and intermediate section 18A. It should be understood that other confirmations which also essentially integrate the tip and intermediate sections 20, 18 will benefit from the present invention. That is, the present invention is applicable to sections of a rotor blade other than just the tip section.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A tip section assembly for a rotor blade comprising:
   a structural tip spar section comprising a first surface and a second surface which each extend from a shear web therebetween, said structural tip spar section at least partially surrounding a first portion of a main blade spar section; and
   a splice cap mounted to an open side of said structural tip spar section and at least partially surrounding a second portion of the main blade spar section.

2. The tip section assembly as recited in claim 1, wherein said structural tip spar section mounts to the main rotor blade spar section such that an open side between said first surface and said second surface faces a leading edge of a main rotor blade.

3. The tip section assembly as recited in claim 1, wherein said structural tip spar section defines an anhedral relative a main rotor blade spar.

4. The tip section assembly as recited in claim 1, wherein said structural tip spar section is at least partially out of a plane defined by the main rotor blade spar section.

5. The tip section assembly as recited in claim 1, further comprising a non-structural tip skin mounted over said structural tip spar section to abut said splice cap.

6. The tip section assembly as recited in claim 5, wherein said tip skin is manufactured of a three-ply fiberglass lay-up.

7. The tip section assembly as recited in claim 1, wherein said first surface and said second surface are non-planar.

8. The tip section assembly as recited in claim 1, wherein said first surface, said second surface and said shear web define a substantially C-shape in cross section.

9. The tip section assembly as recited in claim 1, wherein said first surface, said second surface and said shear web define a substantially U-shape in cross section.

10. A rotor blade assembly comprising:
a main blade spar defining a main blade spar section having at least a top surface and a bottom surface;
a structural spar section comprising a first surface and a second surface each extending from a shear web therebetween, said first and second surfaces of said structural spar section at least partially overlapping a portion of said top and bottom surfaces, respectively, of said main blade spar section; and
a splice cap mounted to an open side of said structural spar section to at least partially overlap a portion of said top and bottom surfaces of said main blade spar section such that said main blade spar section is substantially surrounded by said structural spar section and said splice cap.

11. The rotor blade assembly as recited in claim 10, wherein said structural spar section mounts to said main rotor blade spar section such that an open side between said first surface and said second surface faces a leading edge of a main rotor blade.

12. The rotor blade assembly as recited in claim 10, wherein said first surface, said second surface and said shear web define a substantially C-shape in cross section.

13. The rotor blade assembly as recited in claim 10, wherein said first surface, said second surface and said shear web follow an outer contour of said main blade spar section.

14. The rotor blade assembly as recited in claim 10, wherein said structural spar section includes a structural tip spar section.

15. The tip section assembly as recited in claim 1, wherein said first portion and said second portion are defined generally along a longitudinal length of the main rotor blade spar.

16. The tip section assembly as recited in claim 1, wherein the first portion includes a trailing edge of the main rotor blade spar.

17. The tip section assembly as recited in claim 16, wherein the second portion includes a leading edge of the main rotor blade spar.

18. The tip section assembly as recited in claim 1, wherein said structural tip spar section is mountable around the first portion of the main blade spar section.

19. The tip section assembly as recited in claim 1, wherein said structural tip spar section and said splice cap substantially surround the main blade spar section.

20. The tip section assembly as recited in claim 1, further comprising a non-structural tip skin mounted over said tip spar section and under a portion of said splice cap such that said splice cap overlays a forward edge of said non-structural tip skin.

21. The rotor blade assembly as recited in claim 10, wherein said splice cap extends along a leading edge of both a tip section and an intermediate section of the main rotor blade assembly.

22. The rotor blade assembly as recited in claim 10, wherein said structural tip spar section and said splice cap surround said main blade spar.

23. The rotor blade assembly as recited in claim 10, wherein said structural spar section is bonded to said main blade spar.

24. A rotor blade assembly comprising:
an upper non-structural skin;
a lower non-structural skin;
a main blade spar located between said upper and lower non-structural skins, said main blade spar including a main blade spar section defining a main blade spar longitudinal axis;
a structural spar section comprising a first surface and a second surface each extending from a shear web therebetween, said structural spar section at least partially surrounding an aft portion of said main blade spar section; and
a splice cap mounted to an open side of said structural spar section, said tip cap at least partially surrounding a leading edge portion of said main blade spar section such that said main blade spar section is substantially surrounded by said structural spar section and said splice cap.

25. The rotor blade assembly as recited in claim 24, wherein said main blade spar is a generally tubular member in lateral cross-section.

26. The rotor blade assembly as recited in claim 24, wherein said structural spar section is a structural tip spar section which defines a tip spar longitudinal axis transverse to said main blade spar longitudinal axis.

27. The rotor blade assembly as recited in claim 24, wherein said splice cap is mounted to said open side of said structural spar section to generally follow said main blade spar longitudinal axis.

* * * * *